United States Patent
Wang et al.

(10) Patent No.: US 8,289,139 B2
(45) Date of Patent: Oct. 16, 2012

(54) ELECTRONIC DEVICE, MEDIA MANAGEMENT SYSTEM AND METHOD THEREOF

(75) Inventors: Chuan-Hong Wang, Taipei Hsien (TW); Hong-Yang Yeh, Taipei Hsien (TW); Hsiao-Chung Chou, Taipei Hsien (TW); Li-Zhang Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 780 days.

(21) Appl. No.: 12/483,258

(22) Filed: Jun. 12, 2009

(65) Prior Publication Data

US 2010/0001875 A1  Jan. 7, 2010

(30) Foreign Application Priority Data

Jul. 3, 2008  (CN) .......................... 2008 1 0302513

(51) Int. Cl.
*G08B 1/00* (2006.01)
*G08B 1/08* (2006.01)
*G06F 15/16* (2006.01)
*G06F 15/173* (2006.01)
*G06F 3/00* (2006.01)

(52) U.S. Cl. ................. 340/309.16; 340/539.1; 725/40; 725/58; 709/231; 709/248

(58) Field of Classification Search .................... None
See application file for complete search history.

(56) References Cited

U.S. PATENT DOCUMENTS

| 5,270,829 | A  | * | 12/1993 | Yang ............................. 386/296 |
| 5,541,981 | A  | * | 7/1996  | Lynn ........................... 379/88.25 |
| 7,337,175 | B2 |   | 2/2008  | Comps et al. |
| 8,234,395 | B2 | * | 7/2012  | Millington ................... 709/231 |
| 2004/0236788 | A1 | * | 11/2004 | Sato et al. .................. 707/104.1 |
| 2007/0256100 | A1 | * | 11/2007 | Jeong ............................. 725/40 |
| 2011/0010740 | A1 | * | 1/2011  | Jeong ............................. 725/40 |

FOREIGN PATENT DOCUMENTS

| CN | 1261897 C | 6/2006 |
| CN | 101098615 A | 1/2008 |
| TW | I240564 B | 8/2005 |

* cited by examiner

Primary Examiner — Julie Lieu
(74) Attorney, Agent, or Firm — Altis Law Group, Inc.

(57) ABSTRACT

A method of managing medias, including steps of: receiving medias; detecting whether the media includes a time information including a start time, a finish time, and a display time interval; comparing the current date and time with the start time if the media includes the time information; displaying the media every the display time interval if the current date and time reaches or goes beyond the start time but does not reach the finish time. The time information can be added to the metadata of the media by a user before the media is sent to a receiver. The present invention further provides an electronic device capable of executing the above steps.

13 Claims, 4 Drawing Sheets

| File name | Start time | Finish time | Display time interval | Next display time | Display duration of each time |
|---|---|---|---|---|---|
| a | XXXX-XX-XX, XX.XX | XXXX-XX-XX, XX.XX | XX.XX | XXXX-XX-XX XX.XX, | 1 minute |
| b | XXXX-XX-XX, XX.XX | XXXX-XX-XX, XX.XX | XX.XX | XXXX-XX-XX XX.XX, | 1 minute |
| .... | XXXX-XX-XX, XX.XX | XXXX-XX-XX, XX.XX | XX.XX | XXXX-XX-XX XX.XX, | 1 minute |

FIG. 3

ELECTRONIC DEVICE, MEDIA MANAGEMENT SYSTEM AND METHOD THEREOF

BACKGROUND

1. Technical Field

The disclosure relates to electronic devices and, particularly, to an electronic device capable of managing medias and a method thereof.

2. Description of Related Art

A recent trend in electronic devices, e.g., computers, mobile phones, digital photo frames, and electronic readers (e-reader) is to increase functionalities of the electronic devices by adding additional functions.

One such function added to the electronic devices is to send and receive email. Usually, if a user sends a greeting electronic card (e-card) for a receiver's birthday or holiday, it is expected that the e-card can be received by the receiver on the receiver's birthday or holiday. Nowadays, the electronic devices enable the user to select a particular date in the future to send the email to the receiver's electronic device. The receiver's electronic device notifies the receiver one time when the new email is received. However, if the receiver pays no attention to the email when they receive it, the receiver will not read the email in time.

Therefore, it is necessary to provide an electronic device and a method to overcome the above-identified deficiencies.

BRIEF DESCRIPTION OF THE DRAWINGS

The components in the drawings are not necessarily drawn to scale, the emphasis instead being placed upon clearly illustrating the principles of the electronic device and system. Moreover, in the drawings, like reference numerals designate corresponding parts throughout the several views.

FIG. 3 is a display control table used by the electronic device of FIG. 1 in accordance with an exemplary embodiment.

DETAILED DESCRIPTION

Figure 1:
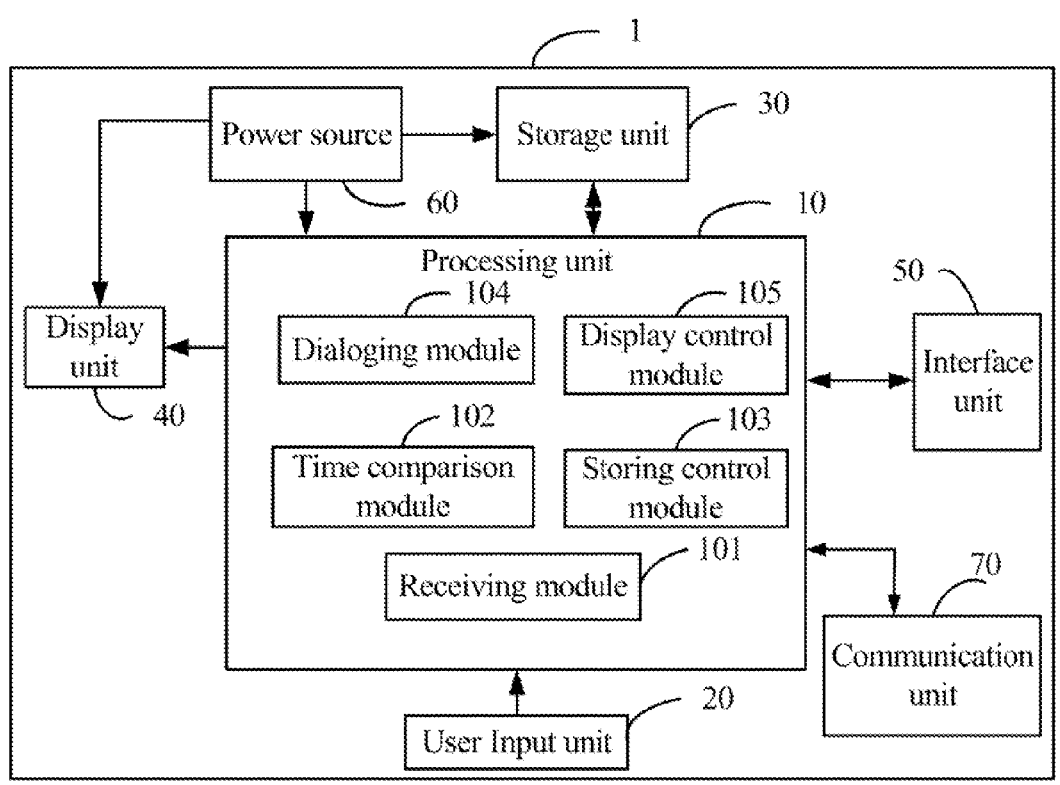
FIG. 1 is a block diagram showing an electronic device for managing media in accordance with an exemplary embodiment.

Referring to FIG. 1, an electronic device 1 capable of managing media in accordance with an exemplary embodiment, includes a processing unit 10, a user input unit 20, a storage unit 30, a display unit 40, an interface unit 50, a power source 60, and a communication unit 70. The electronic device 1 can be an e-reader, a mobile phone, or a digital photo frame, etc.

The interface unit 50 is configured to connect the electronic device 1 to an external electronic device (not shown). The external device can be a storage card (e.g., a secure digital (SD) card, or a compact flash (CF) card) or another electronic device (e.g., a digital camera, a mobile phone, or a computer).

The user input unit 20 is configured to generate instructions in response to user operations. The user input unit 20 can include keys/buttons, knobs, touch panels, and the like.

The storage unit 30 is configured to store media. The display unit 40 is configured to display the media. The media may include, but is not limited to, videos, digital images, digital texts, etc. In the exemplary embodiment, the storage unit 30 is a built-in storage unit, such as a flash memory, a micro drive, and so on. The power source 60 is configured to provide power to elements of the electronic device 1, such as the processing unit 10 and the display unit 40. The communication unit 70 connects the electronic device 1 to one or more other electronic devices via a communication network.

The processing unit 10 further comprises a receiving module 101, a time comparison module 102, a storing control module 103, a dialoging module 104, and a display control module 105.

Figure 2:
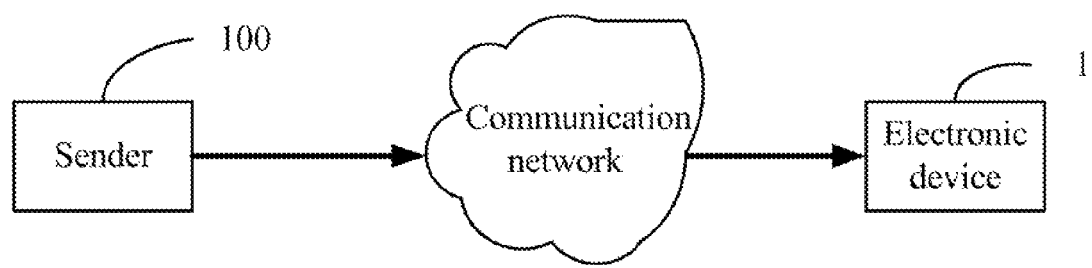
FIG. 2 is a schematic diagram of a system for managing media in accordance with an exemplary embodiment.

Referring also to FIG. 2, the electronic device 1 can receive electronic media from a sender 100 (e.g., a computer, a mobile phone, etc) via a communication network (not labeled). The receiving module 101 of the electronic device 1 receives the media. The time comparison module 102 detects whether a newly received media has time information attached to it. In the exemplary embodiment, the media such as e-cards, may be a video, digital picture, digital texts or combination thereof. In the embodiment, the time information of each of the media includes a time information header for the time comparison module 102 to identify the time information and enable the time comparison module 102 to reliably obtain the time information. Also included is a start time indicating the start time for a period during which the e-card will be displayed on the electronic device 1 every a time interval, a finish time indicating what time the display period ends, the time interval such as an hour, and a display duration of each time such as one minute. In the embodiment, the time information is included in the metadata of the media. When a media is received, the time comparison module 102 detects whether a time information header has been attached in the metadata of the media, and if there is such a header, then the time comparison module 102 will obtain the time information.

The time information is attached to the media before the sender 100 sends the media. For example, if a user uses the sender 100 to send a birthday e-card to the electronic device 1 and wants the e-card to be displayed on May 20, 2008, the user can attach time information to the e-card before sending the e-card. For example, the time information can be set as: #2008-5-20, 10:00 a.m.; 2008-5-20, 9:00 p.m.; 1 hour, 1 minute. Symbol "#" is the time information header for the time comparison module 102 to identify the time information, 2008-5-20, 10:00 a.m. is the start time, 2008-5-20, 9:00 p.m. is the finish time, 1 hour is the display time interval, and one minute is the display duration of each time. According to the time information, the electronic device 1 will display the e-card at 10:00 a.m. of 2008-5-20 for one minute, and repeat each hour until 9:00 p.m.

If the time comparison module 102 determines that no time information is attached, the display control module 105 immediately displays the media or a prompt signal on the display unit 40. The display of the media or the output of the prompt signal continues for a predetermined time and does not automatically repeat.

The time comparison module 102 can also compare current date and time with the start time and the finish time when a media including time information is received. If the time comparison module 102 determines that the current date and time reaches the start time or goes beyond the start time but does not reach the finish time, the display control module 105 controls the display unit 40 to display the media according to the time information.

In the embodiment, if the current date and time falls before the start time, the display control module 102 does not display the media or the prompt signal on the display unit 40. The storing control module 103 stores the received media in the storage unit 30 and sets the display attributes of the media as hidden until the start time becomes current as determined by comparison results of the time comparison module 102, namely, if the start time becomes current, the display control module 105 controls the display unit 40 to display the media according to the time information and the storing control module 103 sets the display attributes of the media as visible. If the finish time has already passed then the media or prompt can be displayed just once instead of at intervals according to the time information.

In the embodiment, the storing control module 103 is also configured for generating a display control table, and adding time information of newly received media to the display control table in case of the time comparison module 102 determines the current date and time falls before the start time of the newly received media or the current date and time falls between the start time and the finish time of the newly received media. An exemplary form of the display control table including six columns is shown in FIG. 3. The time comparison module 102 is also configured to check the display control table at intervals to determine whether any start times become current, for example, the time comparison module 102 checks the display control table every ten minutes. In another embodiment, the time comparison module 102 checks the time information of the medias attached it at intervals to determine whether any start times become current.

Referring to FIG. 3, the six columns of the exemplary display control table are respectively set as file name, start time, finish time, time interval, next display time and display duration of each time. The file name column records names of received media, which include time information. The start time column and the finish time column respectively record the start times indicating the start time for a period during which the e-card will be displayed and the finish times indicating what time the display period ends. The next display time column records the next display time of the medias. The next display time of each media is calculated according to the immediately preceding display time and the time interval of the media. If a media including the time information has never been displayed, the start time of the media is considered as the next display time. The next display time of each media is updated after each time the media is displayed. For example, if the previous display time was 2008-3-20, 10:00 a.m. and the time interval is 2 hours, the next display time is 2009-3-20, 12:00 a.m.

When a media including time information is received, the storing control module 103 adds control information, such as the file name, the start time, the finish time, the next display time, and duration of display each time of the newly received media to the display control table. The time comparison module 102 reads the control information from the table and informs the display control module 105 to control the display of media in accordance with the control information added to the display control table.

In detail, the time comparison module 102 determines whether the current time reaches a next display time of a control information to determine whether any media need to be displayed, if the current time reaches a next display time of a control information, the display control module 105 controls the display unit 40 to display a media corresponding to a file name of the control information. The storing control module 103 accordingly updates the next display time of the media according to the time interval and the immediately preceding display time.

In other embodiments, the display control module 104 can also determine, for example, whether a user would like the received media to be displayed again according to the time information by providing a dialog box to ask the user whether to display the media again. For example, if the user responds to the display media via the user input unit (e.g., closes the displayed media via the user input unit), the dialogue module 104 provides a dialog box to ask whether another display is needed. In the embodiment, the dialog box provides two options such as "Yes" and "No" for the user to choose from. If "Yes" is chosen or no choice is made, the media will be displayed on the display unit 40 again under the control of the display control module 105 according to the time information such as after elapse of time interval, if "No" is chosen; the repeating of display of the media is ended. There may be other ways the user responds to receiving the media and responding functions pre-programmed in the display control module. For example, a user may want to change the time information, or set the media to be the background of the display. Overall, an important point here is that the media should be displayed many times until some kind of response from the user is received, to ensure that the user has noticed the receipt of the media.

If the next display time of a media reaches or goes beyond the finish time or has been ended by the user who choose not to display the media again, the storing control module 103 automatically deletes control information of the media from the display control table.

In other embodiments, each time a media with the time information is received, the storing control module 103 stores the media in a folder specially created to store media with the time information. The time comparison module 102 regularly or continuously searches in the folder to find media with display times presently occurring and informs the display control module 102 to control the display of those medias according to their time information. If the next display time of a media reaches or comes beyond its finish time or has been ended by the user who chooses not to display the media again, the storing control module 103 moves the media from the folder to another folder.

Figure 4:
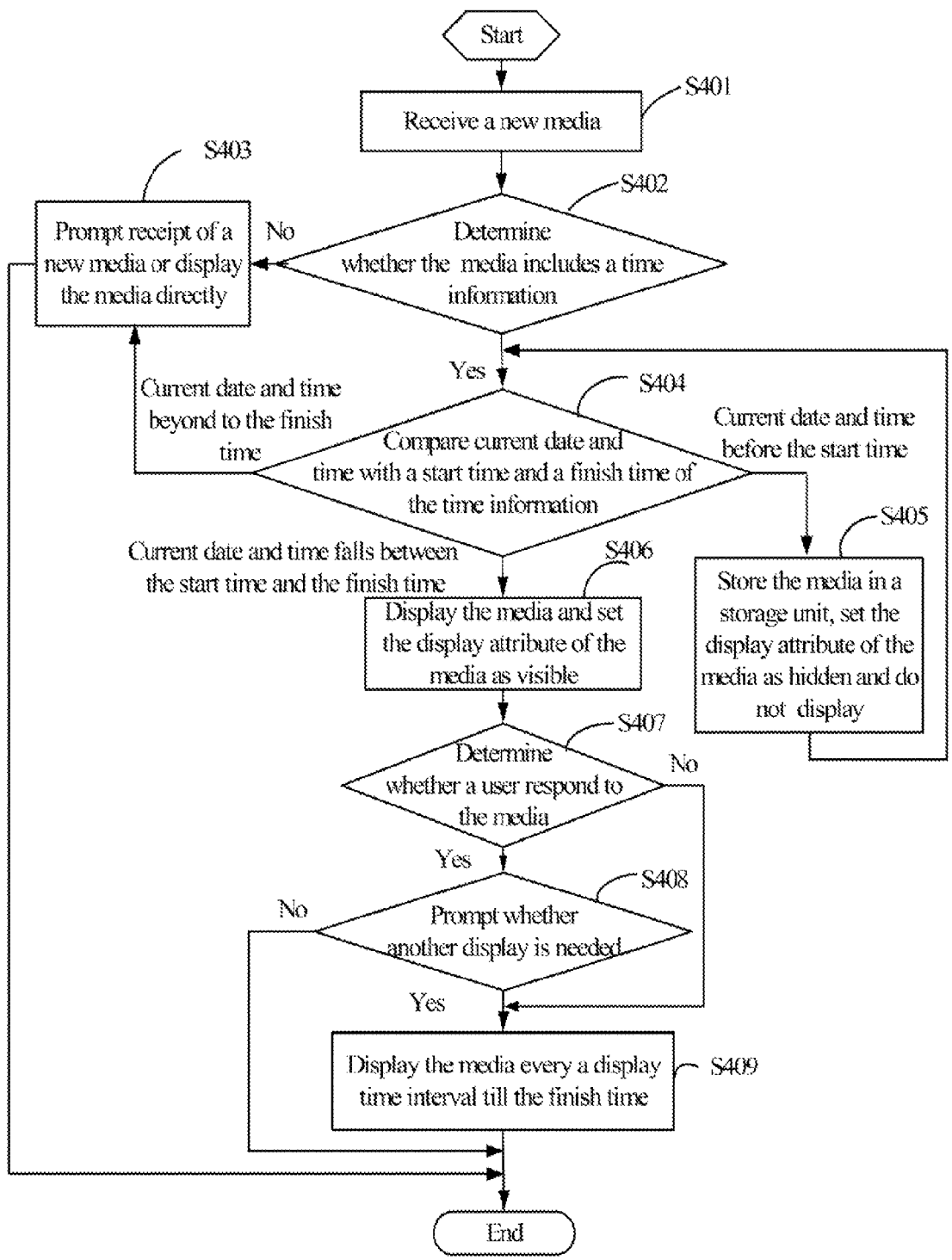
FIG. 4 is a flowchart illustrating an exemplary method for managing media applied in the electronic device of FIG. 1.

FIG. 4 is a flowchart illustrating a method for managing medias for the device 1. In step S401, the receiving module 101 receives a media.

In step S402, the time comparison module 102 detects whether the newly received media has time information attached to it. The time information includes a time information header for the time comparison module 102 to identify the time information and enable the time comparison module 102 to reliably obtain the time information, a start time indicating the start time for a period during which the e-card will be displayed on the electronic device 1 every time interval, a finish time indicating what time the display is about to finish, the time interval, and duration of display each time.

If the media has not been attached with the time information, in step S403, the display control module 105 controls the display unit 40 to display the media or output a prompt signal immediately. The whole process is over.

If the media has been attached with the time information, in step S404, the time comparison module 102 compares current date and time with the start time and the finish time of the time information, for example, the time comparison module 102 checks the display control table at intervals to determine whether any start times become current or checks the time information of the medias attached it at intervals to determine whether any start times become current.

If the time comparison module 102 determines that the current date and time falls before the start time, in step S405, the storing control module 103 stores the media in the storage unit 30 and sets the display attribute of the media as hidden, the process then goes back to step S404.

If the time comparison module 102 determines that the current date and time goes beyond the finish time, the display control module 105 controls the display unit 40 to display the media or output a prompt signal immediately. The whole process is over.

If the time comparison module 102 determines that the current date and time reaches the start time or goes beyond the start time but does not reach the finish time, in step S406, the display control module 105 controls the display unit 40 to display the media immediately and the storing control module 103 sets the display attribute of the media as visible.

In step S407, the dialoging module 104 determines whether a user responds to the displayed media.

If the user does not responds to the displayed media, the process goes to step S409, otherwise, in step S408, the dialoging module 104 provides a dialog box to ask whether to display the media again if the user respond to the displayed media.

If the answer of not displaying the media again is received, the whole process is over. Otherwise, in step S409, the display control module 105 controls to display the media on the display unit 40 every time interval till the finish time. The whole process is over. Essentially, compared to the prior art, the present disclosure provides for media to be sent once but be displayed repeated many times automatically at the receiving end to ensure receipt.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the present disclosure.

What is claimed is:

1. An electronic device, comprising:
   a storage unit;
   a communication module configured for connecting the electronic device to other electronic devices via a communication network;
   a receiving module configured for receiving medias via the communication module;
   a time comparison module configured for detecting whether a newly received media includes time information comprising a start time, a finish time, and a time interval, and comparing the current date and time with the start time and the finish time of the time information if the media includes the time information;
   a display control module configured for controlling a display unit to display the media repeatedly every time interval till the finish time if the time comparison module determines the current date and time reaches or goes beyond the start time but does not reach the finish time, and further configured for displaying a prompt signal on the display unit just once if the current date and time goes beyond the finish time of the media; and
   a storing control module configured for storing the received media into the storage unit, and set the display attribute of the media as hidden if the time comparison module determines the current date and time falls before the start time of the time information.

2. The electronic device of claim 1, further comprising a user input unit, wherein the electronic device further comprises a dialoging module configured for determining whether a user responds to the display media via the user input unit and providing a dialog box to ask the user whether to display the media, and the display control module is further configured for controlling the display unit to display the media again if another display is required by the user.

3. The electronic device of claim 1, wherein, the storing control module is further configured for creating a display control table in the storage unit, and adding a control information to the display control table according to the time information of a newly received media, and the time comparison module is further configured for reading the control information from the display control table and informing the display control module to control the display of the newly received media in accordance with control information.

4. The electronic device of claim 3, wherein the control information comprises a file name, a start time, a finish time, a time interval, a next display time of the newly received media and a display duration.

5. The electronic device of claim 4, wherein the next display time is calculated according to the previous display time and the time interval of the media, if a media including the time information has never been displayed, the start time of the media is considered as the next display time.

6. The electronic device of claim 5, wherein, the time comparison module is further configured for comparing the current date and time with a next display time of control information of the display control table, if the current date and time reaches to a next display time of a control information, the display control module controls the display unit to display a media corresponding to a file name of the control information for the display duration.

7. The electronic device of claim 1, wherein the time information further comprises a time information header for identifying the time information for the time comparison module.

8. The electronic device of claim 1, wherein the storing control module is further configured for storing newly received medias including time information in a folder in the storage unit and moving medias whose next display time reach or come beyond their finish time or medias which users choose not to display again from the folder, and the time comparison module is configured for searching in the folder to determine medias which are about to display and signaling the display control module to control the display of those medias according to their time information.

9. The electronic device of claim 1, wherein the time information is added in the metadata of a media.

10. A method for managing medias applied in an electronic device, the method comprising:
    receiving a media;
    determining whether the media includes a time information, wherein the time information includes a start time, a finish time, and a time interval;
    comparing the current date and time with the start time and the finish time of the media if the media includes the time information;
    displaying the media on a display unit repeatedly every time interval if the current date and time reaches or goes beyond the start time but does not reaches the finish time;
    setting the display attribute of the media as hidden if the current date and time falls before the start time of the time information; and
    displaying a prompt signal immediately if the media including no time information or the current date and time falls behind the finish time.

11. The method of claim 10, wherein the time information further comprises a time interval, and the method further comprises:

prompting a user whether to display the media again if the user responds to the displayed media;

displaying the media again after the time interval if the user choose to display the media again;

terminating the display of the media if the user choose not to display the media again.

12. A system for managing medias, the system comprising:

a first electronic device configured for adding time information to a media and sending the media to a second electronic device, wherein the time information comprises a start time, a finish time and a time interval;

the second electronic device comprising:

a receiving module configured for receiving the media;

a storage unit configured for storing the media;

a display unit configured for displaying the media;

a time comparison module configured for comparing the current date and time with the start time and the finish time of the time information;

a display control module configured for controlling a display unit to display the media repeatedly every time interval till the finish time if the time comparison module determines the current date and time reaches or goes beyond the start time, and further configured for displaying a prompt signal on the display unit if the current date and time goes beyond the finish time of the media; and a storing control module configured for storing the received media into the storage unit, and set the display attribute of the media as hidden if the time comparison module determines the current date and time falls before the start time of the time information.

13. The electronic device of claim 12, further comprising a user input unit, wherein the electronic device further comprises a dialoging module configured for determining whether a user responds to the display media via the user input unit and providing a dialog box to ask the user whether to display the media, and the display control module is further configured for controlling the display unit to display the media again if another display is required by the user.

* * * * *